(12) United States Patent
Park

(10) Patent No.: US 8,406,529 B2
(45) Date of Patent: Mar. 26, 2013

(54) METHOD FOR EVALUATING MOVING IMAGE RESOLUTION

(75) Inventor: Se-Hong Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 701 days.

(21) Appl. No.: 12/617,132

(22) Filed: Nov. 12, 2009

(65) Prior Publication Data

US 2010/0135583 A1 Jun. 3, 2010

(30) Foreign Application Priority Data

Dec. 1, 2008 (KR) .................. 10-2008-0120752

(51) Int. Cl.
*G06K 9/48* (2006.01)
*G06K 9/66* (2006.01)
(52) U.S. Cl. .................. 382/199; 382/190; 382/195
(58) Field of Classification Search .................. None
See application file for complete search history.

(56) References Cited

U.S. PATENT DOCUMENTS

| 2006/0088202 A1* | 4/2006 | Venkatachalam | 382/152 |
| 2006/0279633 A1* | 12/2006 | Oka | 348/187 |
| 2008/0043024 A1* | 2/2008 | Schiwietz et al. | 345/442 |
| 2008/0265130 A1* | 10/2008 | Colomb et al. | 250/201.9 |
| 2010/0092472 A1* | 4/2010 | Al-Jamal et al. | 424/139.1 |

* cited by examiner

*Primary Examiner* — Bhavesh Mehta
*Assistant Examiner* — Nirav G Patel
(74) *Attorney, Agent, or Firm* — Morgan, Lewis & Bockius LLP

(57) ABSTRACT

Disclosed is a method for evaluating a moving image resolution capable of quantitatively evaluating a moving image resolution for a display device. The method comprises displaying a test pattern on a screen, and moving the test pattern in a predetermined direction; obtaining an image of the test pattern on the screen; removing noise from the image; detecting edge regions of the image having noise removed therefrom; emphasizing the detected edge regions; scanning the emphasized edge regions by rotating any reference line a plurality of times, the reference line passing through a center point of the emphasized edge regions; and analyzing a pattern of the scanned result, and comparing it with the original test pattern.

7 Claims, 8 Drawing Sheets

OK    OK    OK

OK    NG    NG

METHOD FOR EVALUATING MOVING IMAGE RESOLUTION

RELATED APPLICATION

The present disclosure relates to subject matter contained in priority Korean Application No. 10-2008-120752, filed on Dec. 1, 2008, which is herein expressly incorporated by reference in its entirety.

BACKGROUND OF THE INVENTION

1. Field of the Invention

The present invention relates to a method for evaluating a moving image resolution, and more particularly, to a method for quantitatively evaluating a moving image resolution for a display device.

2. Background of the Invention

In general, a liquid crystal display (LCD) device is being widely used due to advantages such as a light weight, a thin thickness, and low power consumption. Accordingly, the LCD device is being widely used to display images on screens of a portable computer such as a notebook PC, an office automation equipment, and an audio/video apparatus.

The LCD device displays desired images on a screen by controlling optical transmittance according to image signals applied to a plurality of controlling switching devices arranged in a matrix format.

The LCD device comprises an LC panel and a driving portion. The LC panel includes an upper substrate, a color filter substrate facing a lower substrate, a thin film transistor (TFT) array substrate, and an LC layer disposed between the upper and lower substrates. The driving portion drives the LC panel by supplying scan signals and image information to the LC panel.

Have been proposed various methods for evaluating a moving image resolution for the LCD device. Representative methods include a direct evaluation method by an inspector's naked eyes while displaying a test pattern on a screen and moving the test pattern in a predetermined direction, and an indirect evaluation method by using a short time Fourier transform. According to the indirect evaluation method, an image of a test pattern is obtained while displaying the test pattern on a screen and moving the test pattern in a predetermined direction, and then a result of the image having undergone a short time Fourier transform is analyzed.

Hereinafter, the conventional method for evaluating a moving image resolution will be explained in more detail with reference to FIGS. 1 to 3.

FIG. 1 is a view showing a test pattern displayed on a screen of an LCD device in the conventional method for evaluating a moving image resolution, and FIG. 2 is a view showing images of the test pattern of FIG. 1, the images directly observed by an inspector's eyes while the inspector moves the test pattern in the arrow direction.

Referring to FIGS. 1 and 2, in the direct evaluation method by an inspector's naked eyes, a test pattern is displayed on a screen for a display device. Then, the inspector directly observes images of the test pattern while moving the test pattern in the arrow direction. Here, if lines having the same number as that of the test pattern are observed, it is judged that the display device has successfully undergone a moving image resolution test (OK). However, if the number of observed lines is different from the number of lines of the test pattern, it is judged that the display device has unsuccessfully undergone a moving image resolution test (NG).

FIG. 3 is a view showing a method for evaluating a moving image resolution by a short time Fourier transform, in which FIG. 3A shows an image of a test pattern displayed on a screen, the image observed while the test pattern is moved in the arrow direction, FIG. 3B is a graph showing a brightness level corresponding to any horizontal line of the image, and FIG. 3C is a graph sequentially showing a position, an amplitude, and a phase according to a frequency with a result obtained by applying a short time Fourier transform to the brightness level.

As shown in FIG. 3A, a test pattern is displayed on a screen. Then, as shown in FIG. 3B, a bright level graph of the test pattern corresponding to any horizontal line is obtained while moving the test pattern in the arrow direction. Then, as shown in FIG. 3C, results to which a short time Fourier transform has been applied are analyzed, thereby judging whether the display device has successfully undergone a moving image resolution test or not.

However, the conventional method for evaluating a moving image resolution has the following problems.

Firstly, in the method by an inspector's naked eyes, different test results may occur due to a difference between inspectors. This may cause a difficulty in quantifying tested results with respect to images of a test pattern.

Secondly, in the method by a short time Fourier transform, it is difficult to quantify test results obtained by applying a short time Fourier transform due to irregularity of the results.

SUMMARY OF THE INVENTION

Therefore, an object of the present invention is to provide a method for quantitatively evaluating a moving image resolution for a display device.

To achieve these and other advantages and in accordance with the purpose of the present invention, as embodied and broadly described herein, there is provided a method for evaluating a moving image resolution for a display device, comprising displaying a test pattern on a screen, and moving the test pattern in a predetermined direction; obtaining an image of the test pattern on the screen; removing noise from the image; detecting edge regions of the image having noise removed therefrom; emphasizing the detected edge regions; scanning the emphasized edge regions by rotating any reference line a plurality of times, the reference line passing through a center point of the emphasized edge regions; and analyzing a pattern of the scanned result, and comparing it with the original test pattern.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a view showing a method for evaluating a moving image resolution by a short time Fourier transform, in which

FIGS. 6A to 6D are views showing processes for removing noise from the image of FIG. 5, in which FIG. 6A shows a result obtained by applying a discrete Fourier transform to an image having noise removed therefrom, FIG. 6B is a view showing a Butterworth low pass filter for removing a high frequency component of the result of FIG. 6A, FIG. 6C shows a result obtained by applying the Butterworth low pass filter to the result of FIG. 6A having undergone a discrete Fourier transform, and FIG. 6D shows a result obtained by applying an inverse discrete Fourier transform to the result of FIG. 6C;

DETAILED DESCRIPTION OF THE INVENTION

Description will now be given in detail of the present invention, with reference to the accompanying drawings.

Hereinafter, a method for evaluating a moving image resolution according to the present invention will be explained in more detail with reference to the attached drawings.

Figure 1:
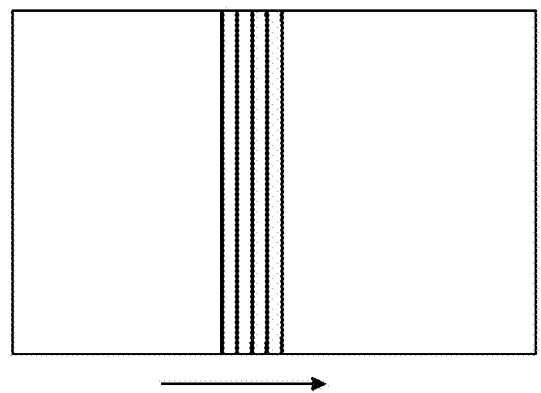
FIG. 1 is a view showing a test pattern displayed on a screen of an LCD device in the conventional method for evaluating a moving image resolution.
Figure 2:
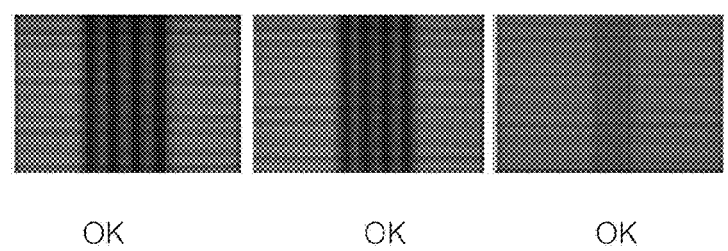
FIG. 2 is a view showing images of the test pattern of FIG. 1, the images directly observed by an inspector's eyes while the inspector moves the test pattern in the arrow direction.
Figure 2:
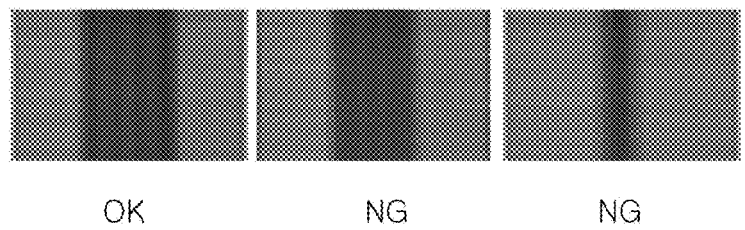
Figure 3A:
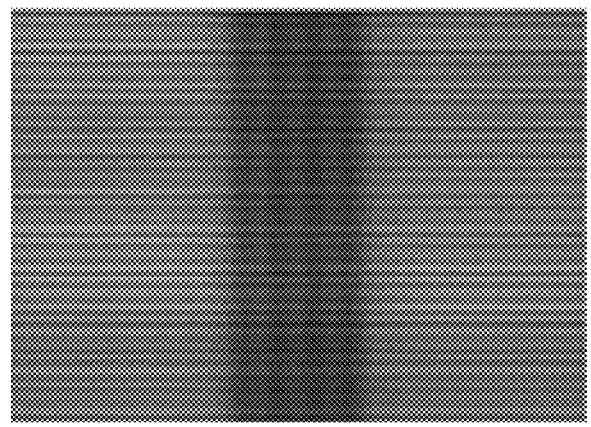
FIG. 3A shows an image of a test pattern displayed on a screen, the image observed while the test pattern is moved in the arrow direction.
Figure 3B:
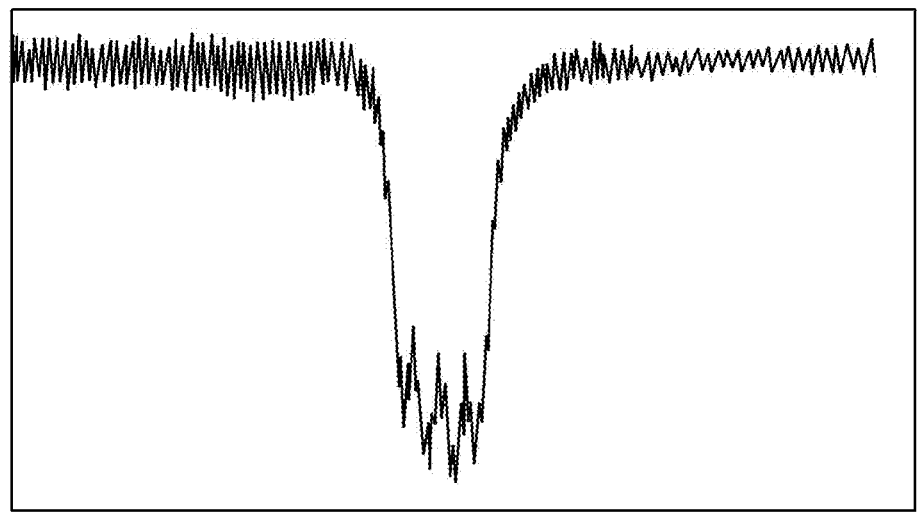
FIG. 3B is a graph showing a brightness level corresponding to any horizontal line of the image.
Figure 3C:
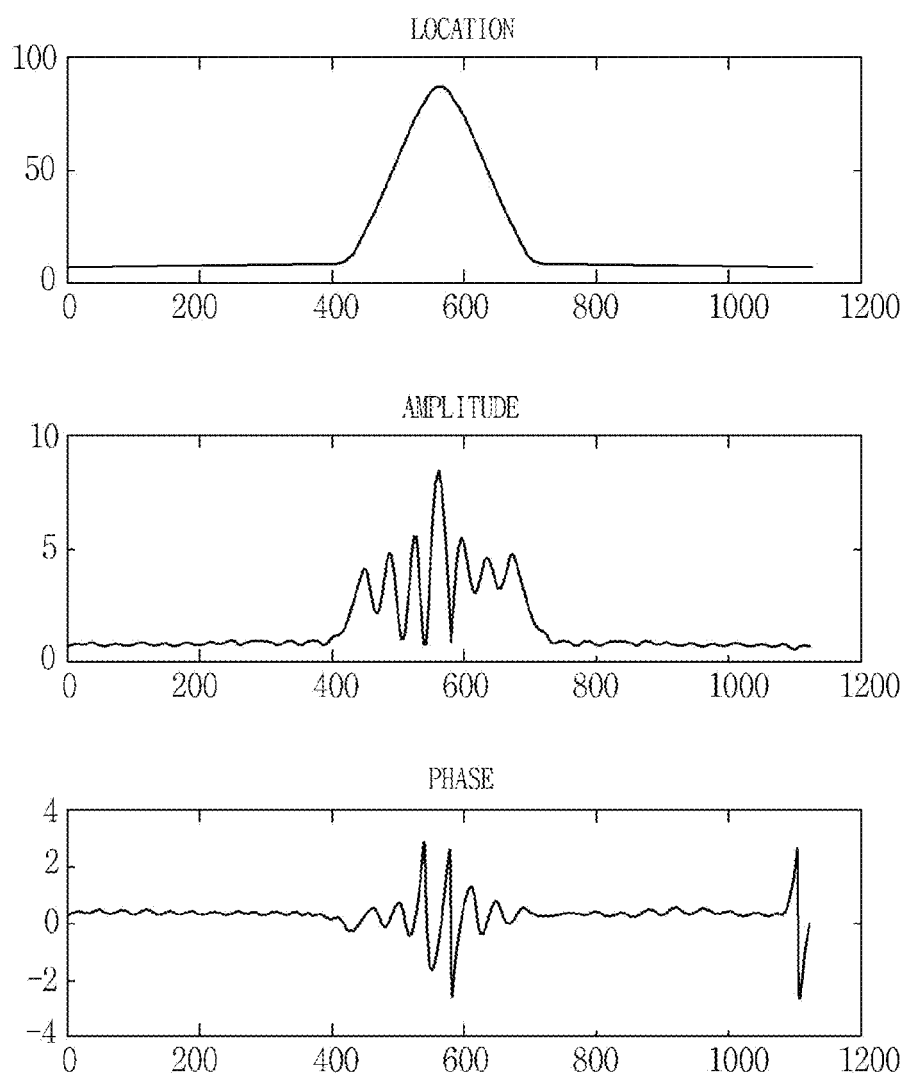
FIG. 3C is a graph sequentially showing a position, an amplitude, and a phase according to a frequency with respect to a result obtained by applying a short time Fourier transform to the brightness level of FIG. 3B.
Figure 4:
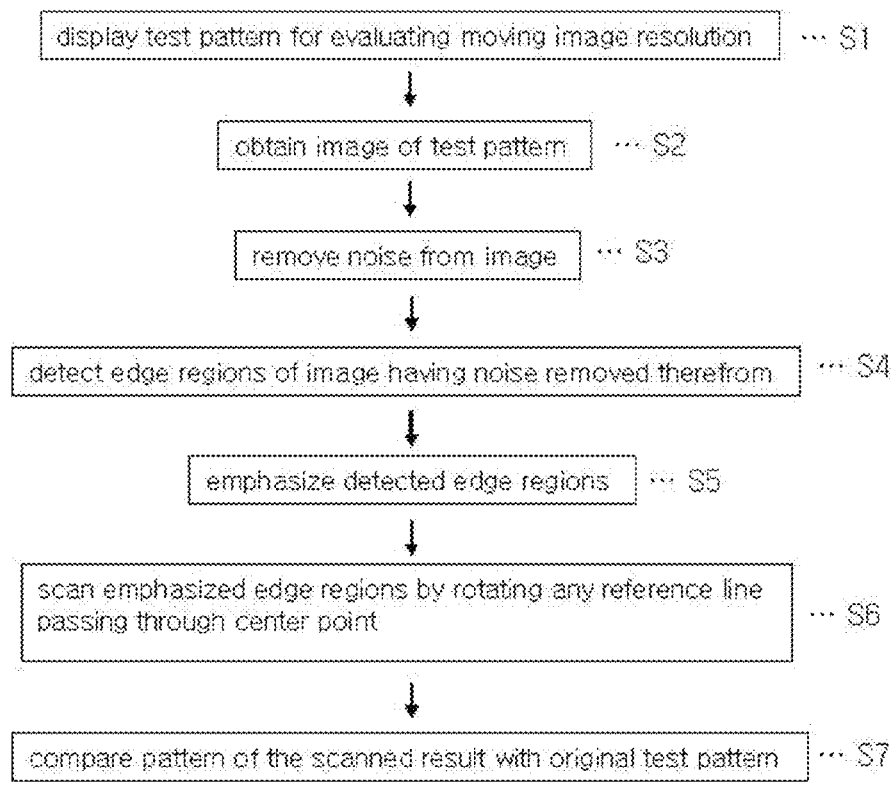
FIG. 4 is a flowchart showing a method for evaluating a moving image resolution according to a present invention.

As shown in FIG. 4, a method for evaluating a moving image resolution, comprising displaying a test pattern on a screen, and moving the test pattern in a predetermined direction (S1); obtaining an image of the test pattern on the screen (S2); removing noise from the image (S3); detecting edge regions of the image having noise removed therefrom (S4); emphasizing the detected edge regions (S5); scanning the emphasized edge regions by rotating any reference line a plurality of times, the reference line passing through a center point of the emphasized edge regions (S6); and analyzing a pattern of the scanned result, and comparing it with the original test pattern (S7).

The method for evaluating a moving image resolution according to the present invention will be explained in more detail.

Firstly, a test pattern for evaluating a moving image resolution is displayed on a screen for a display device, and then the test pattern is moved in a predetermined direction (S1).

Here, the test pattern includes a plurality of lines.

In a preferred embodiment of the present invention, the test pattern is configured to have five vertical lines parallel to each other. However, the number of the test pattern of the present invention is not limited to five. The number and shapes of the test pattern may have various modifications within the scope of the present invention.

Furthermore, in a preferred embodiment of the present invention, a moving direction of the test pattern is set as a right direction. However, the moving direction of the test pattern is not limited to the right direction. The moving direction of the test pattern may have various modifications within the scope of the present invention.

Figure 5:
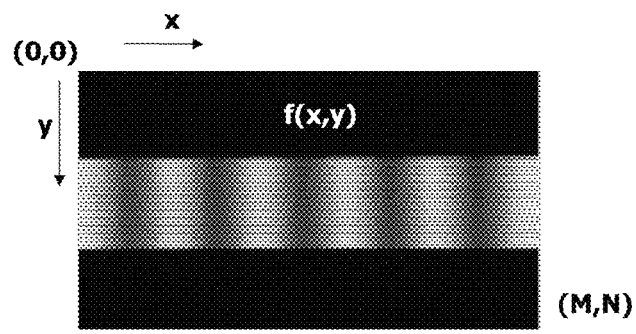
FIG. 5 is a photo showing an image of a test pattern, the image obtained while moving a test pattern in a right direction according to the present invention.

Next, as shown in FIG. 5, an image of the test pattern moving on the screen in a predetermined direction is obtained (S2).

FIG. 5 is a photo showing an image of a test pattern for any display device, the image obtained while moving each line of a test pattern on a screen in a right direction according to the present invention. The image obtained by a display device is similar to that directly observed by an inspector's naked eyes. Here, the image obtained by a display device may be an image rather than the image of FIG. 5 according to types or models of the display device.

Figure 6A:
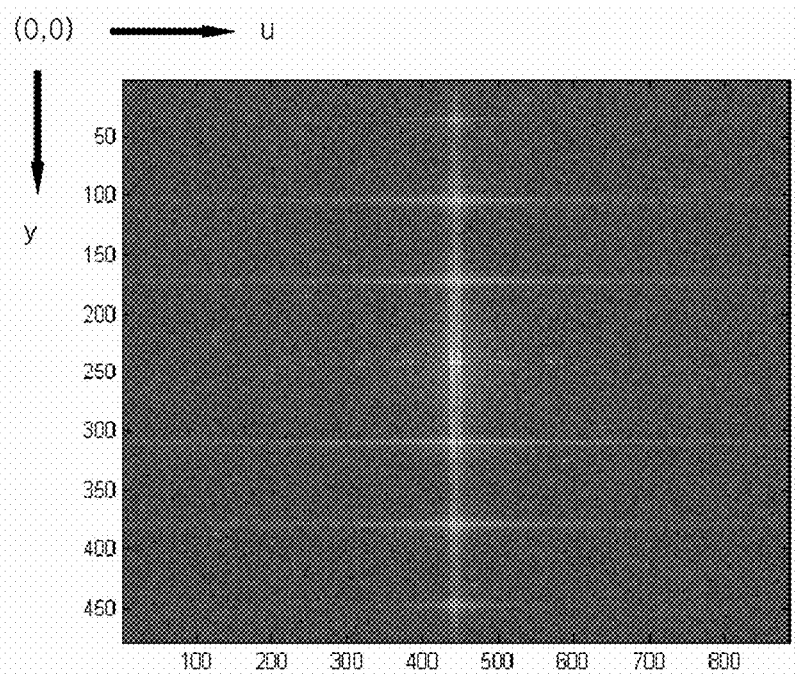
Figure 6B:
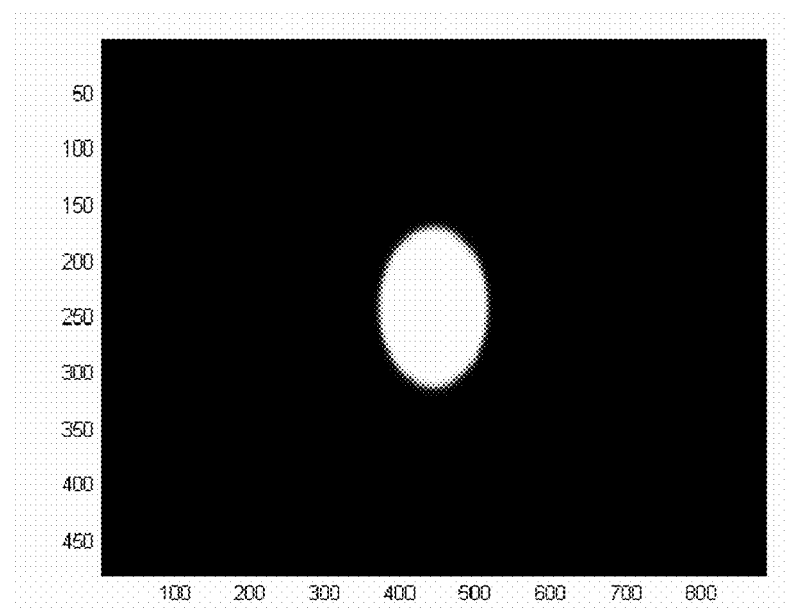
Figure 6C:
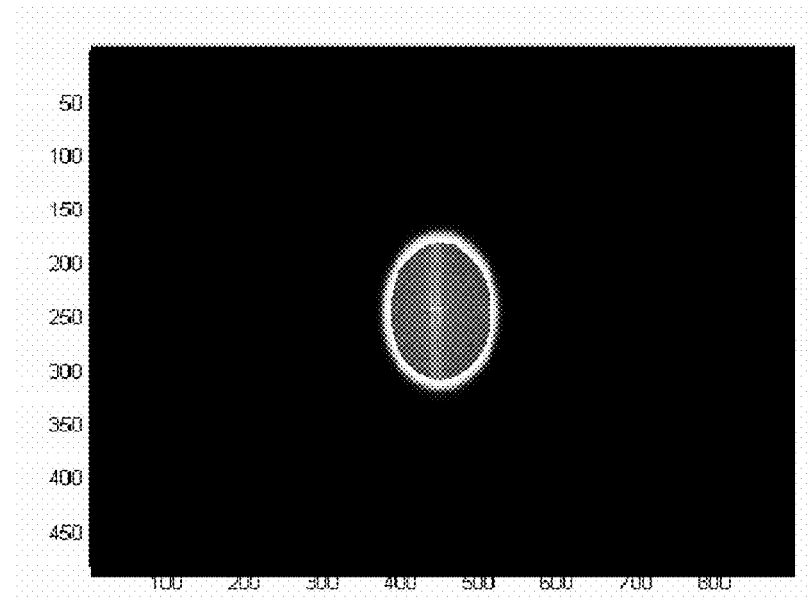
Figure 6D:
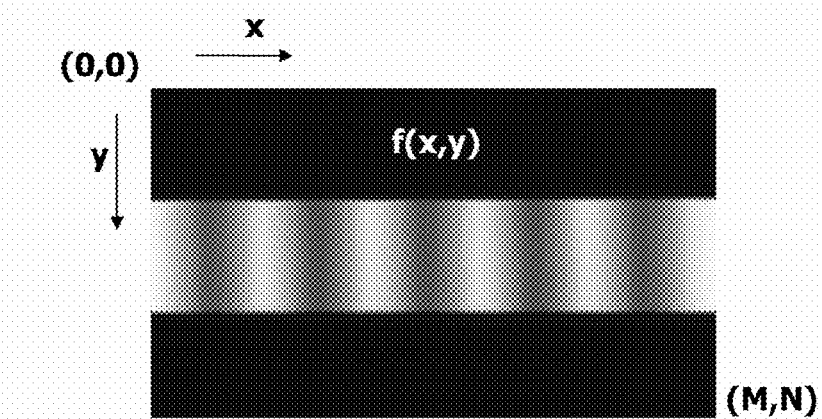

Next, as shown in FIG. 6D, the image of FIG. 5 undergoes a noise removing process, and then is outputted (S3).

FIGS. 6A to 6D are views showing processes for removing noise from the image of FIG. 5.

More specifically, FIG. 6A shows a high frequency component and a low frequency component of a result obtained by applying a discrete Fourier transform to the image of FIG. 5.

FIG. 6B is a view showing a Butterworth low pass filter for passing only a low frequency component, and FIG. 6C shows an output obtained by convoluting the result of FIG. 6A having undergone a discrete Fourier transform with the low path filter of FIG. 6B. Here, the high frequency component is a noise component, and the low frequency component is a component corresponding to the test pattern. And, FIG. 6D shows a result obtained by applying an inverse discrete Fourier transform to the result of FIG. 6C having passed through a Butterworth low pass filter, which shows an image having noise removed therefrom.

The discrete Fourier transform is defined as the following formula 1.

$$F(u, v) = \frac{1}{MN} \sum_{x=0}^{M-1} \sum_{y=0}^{N-1} f(x, y) e^{-j2\pi(ux/M + vy/N)} \qquad [\text{Formula 1}]$$

The Butterworth low pass filter is defined as the following formula 2.

$$H(u, v) = \frac{1}{1 + \left[\frac{D(u, v)W}{D^2(u, v) - D_0^2}\right]^{2n}} \qquad [\text{Formula 2}]$$

Here, the $D_0$ indicates a radius of the Butterworth low pass filter shown in FIG. 6B. And, the inverse discrete Fourier transform is defined as the following formula 3.

$$G(u, v) = F(u, v) * H(u, v) \qquad [\text{Formula 3}]$$

More concretely, the image of FIG. 5 undergoes a discrete Fourier transform, and a result thereof is output, thereby discriminating a high frequency component and a low frequency component from each other. The result having undergone the discrete Fourier transformation as shown in FIG. 6A is convoluted with the Butterworth low pass filter as shown in FIG. 6B, thereby obtaining a result as shown in FIG. 6C. The result of FIG. 6C undergoes an inverse discrete Fourier transform, and then is output, thereby obtaining an image having noise removed therefrom.

Figure 7:
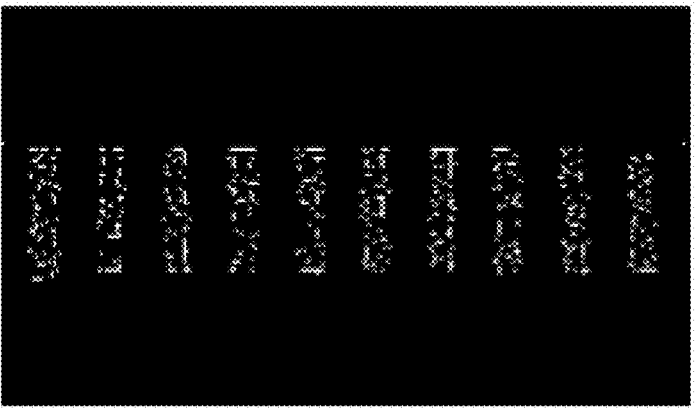
FIG. 7 is a view showing detected edge regions of an image having noise removed therefrom.

Next, the image having noise removed therefrom of FIG. 6D undergoes an edge-component removing process, and then is output as shown in FIG. 7 (S4). Here, the edge regions are regions of an image having noise removed therefrom, in which a variation degree of a brightness level is large. The edge regions are detected based on a gradient obtained by primarily or secondarily differentiating a brightness level of the image having noise removed therefrom. The edge regions may be detected by a sobel filter, for example.

The gradient of a brightness level of the image having noise removed therefrom is defined as a vector (f) shown in the following formula 5, and a direction of the image is defined as θ(x,y) shown in the following formula 6. In the present invention, a moving image resolution of a test pattern is obtained by using an image obtained while the test pattern is moved in a right direction. Accordingly, it is possible that the image having noise removed therefrom undergoes a differentiation only in an 'x'-axis direction.

$$\nabla f = \begin{bmatrix} Gx \\ Gy \end{bmatrix} = \begin{bmatrix} \frac{\partial f}{\partial x} \\ \frac{\partial f}{\partial y} \end{bmatrix} \quad \text{[Formula 4]}$$

$$\nabla f = \text{mag}(\nabla f) = [G_x^2 + G_y^2]^{1/2} \quad \text{[Formula 5]}$$

$$\theta(x, y) = \tan^{-1}\left(\frac{G_x}{G_y}\right) \quad \text{[Formula 6]}$$

Figure 8:
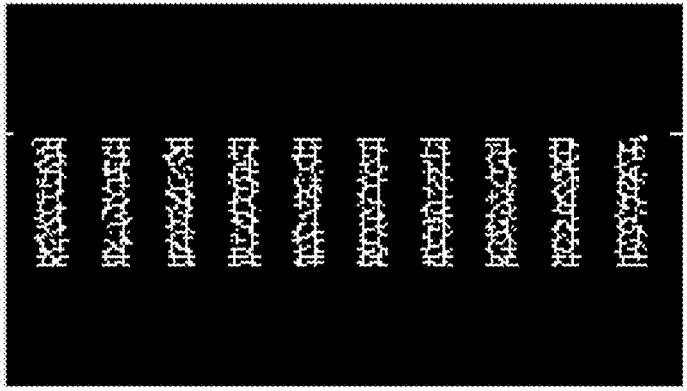
FIG. 8 is a view showing the edge regions of FIG. 7 with an emphasis.

Next, as shown in FIG. 8, the edge regions of the image having noise removed therefrom are visualized with an emphasis (S5).

In order to emphasize the edge regions, a morphology-based dilation calculation may be used.

The morphology is a morphological technique for extracting image components effective in representing forms such as edges, skeletons, and blocks by explicating an inner structure of images. The morphology includes dilation, erosion, opening or closing calculations, etc. The dilation calculation serves to fill empty spaces of an image, or connect spaces spacing from each other with a short distance therebetween.

Next, the edge regions are scanned by rotating any reference line a plurality of times, the reference line passing through a center of the edge regions (S6).

Figure 9A:
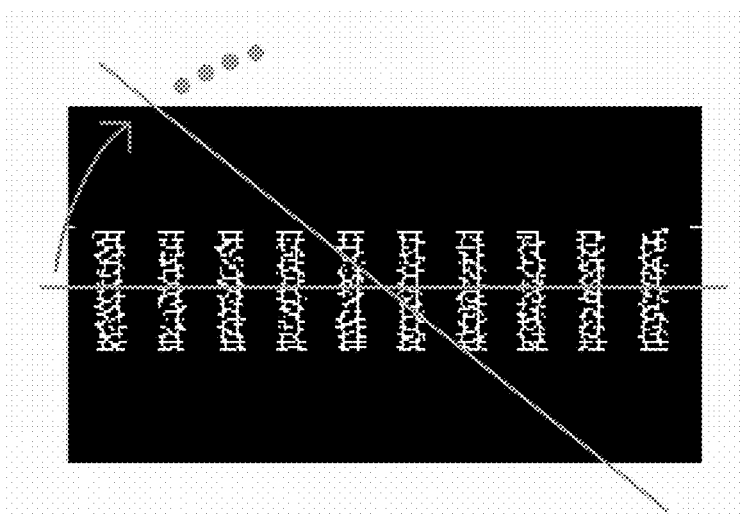
FIG. 9A is a view showing any reference line used to scan the edge regions of FIG. 8 by being rotated a plurality of times.

FIG. 9A shows any reference line for scanning the edge regions of FIG. 8 by being rotated a plurality of times. The edge regions of FIG. 8 are scanned by rotating the reference line by at least 180° in the arrow direction, thereby obtaining a result shown in FIG. 9B.

Figure 9B:
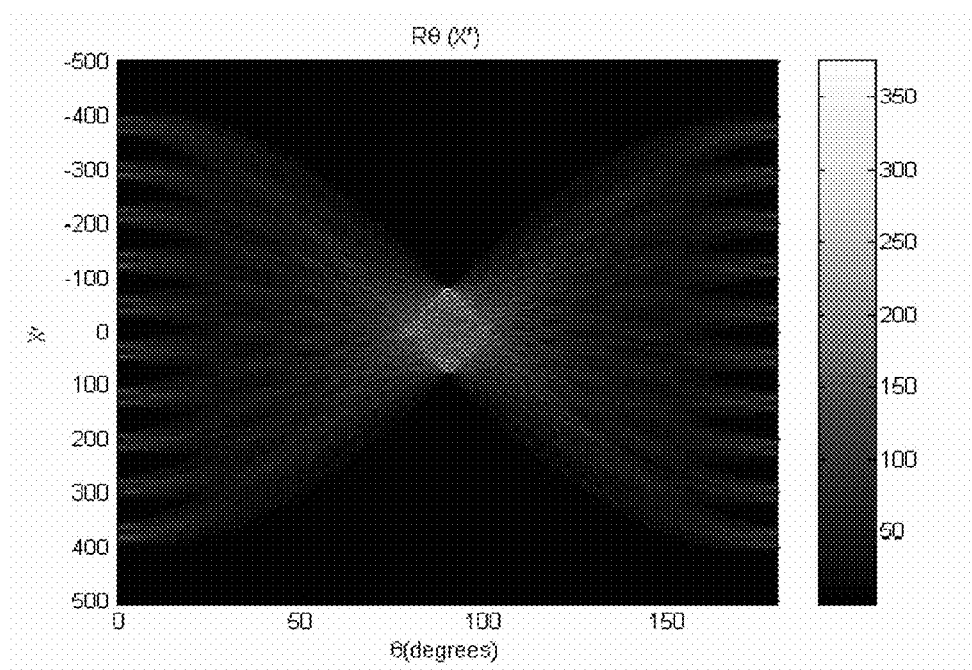
FIG. 9B is a view showing a result image obtained after scanning the edge regions of FIG. 8 by rotating the reference line of FIG. 9A a plurality of times.

Next, the scanned result shown in FIG. 9B is analyzed, and then is compared with the test pattern inputted to the display device, thereby judging whether the display device has successfully undergone a moving image resolution test based on coordinate values of the scanned image (S7).

Here, it is tested whether the number of lines of the scanned result corresponds to two times of the number of lines of the test pattern inputted to the display device. If the numbers are equal to each other, it is judged that the display device has successfully undergone a moving image resolution test (OK). On the contrary, if the numbers are not equal to each other, it is judged that the display device has unsuccessfully undergone a moving image resolution test (NG).

It was assumed that the test pattern has five vertical lines in the present invention, and the scanned result of FIG. 9B showed ten edge regions. Accordingly, it can be seen that the display device of the present invention has successfully undergone a moving image resolution test.

In the method for evaluating a moving image resolution of the present invention, edge regions of an image having noise removed therefrom are detected to be emphasized. Then, the emphasized edge regions are scanned by rotating any reference line a plurality of times. The scanned result is represented as clear patterns, which allows quantification of tested values with respect to a moving image resolution for a display device.

Furthermore, the method of the present invention may be applied not only to an LCD device, but also to other types of display devices.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for evaluating a moving image resolution for a display device, comprising:
    displaying a test pattern on a screen, and moving the test pattern in a predetermined direction;
    obtaining an image of the test pattern on the screen;
    removing noise from the image;
    detecting edge regions of the image having noise removed therefrom;
    emphasizing the detected edge regions;
    scanning the emphasized edge regions by rotating any horizontal reference line passing through a center point of the emphasized edge regions in at least 180°, thereby obtaining precise coordinates of a result image; and
    analyzing a pattern of the scanned result, and comparing it with the original test pattern.

2. The method of claim 1, wherein the test pattern includes a plurality of lines parallel to each other.

3. The method of claim 1, wherein the step of removing noise from the image comprises:
    applying a discrete Fourier transform to the image, and outputting a result thereof;
    applying a low pass filter to the result; and
    applying an inverse discrete Fourier transform to the low pass filter result, and outputting an image having noise removed therefrom.

4. The method of claim 3, wherein the low pass filter is a Butterworth low pass filter.

5. The method of claim 1, wherein the step of detecting edge regions of the image having noise removed therefrom is performed by applying a sobel filter to the image having noise removed therefrom.

6. The method of claim 1, wherein the step of emphasizing the detected edge regions is performed by applying a morphology-based dilation calculation to the detected edge regions.

7. The method of claim 1, wherein in the step of analyzing a pattern of the scanned result and comparing it with the original test pattern, it is tested whether the number of lines of the scanned result corresponds to two times of the number of lines of the test pattern inputted to the display device.

* * * * *